(12) United States Patent
Tadas

(10) Patent No.: US 7,483,174 B2
(45) Date of Patent: Jan. 27, 2009

(54) METHOD, APPARATUS AND SYSTEM FOR PERFORMING TETRAHEDRAL COLOR CONVERSION FOR IMAGE PROCESSING

(75) Inventor: Shashikiran Tadas, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 667 days.

(21) Appl. No.: 11/174,133

(22) Filed: Jun. 30, 2005

(65) Prior Publication Data

US 2007/0052720 A1    Mar. 8, 2007

(51) Int. Cl.
*G03F 3/08* (2006.01)
*G06F 15/00* (2006.01)

(52) U.S. Cl. .............. 358/1.9; 358/3.23; 358/518; 358/530; 358/525; 382/276; 345/300; 345/602

(58) Field of Classification Search ............ 358/1.9, 358/3.23, 518, 523, 524, 530, 525; 345/591, 345/601, 602, 604, 600; 382/162, 167, 276

See application file for complete search history.

(56) References Cited

U.S. PATENT DOCUMENTS

| | | | | |
|---|---|---|---|---|
| 5,581,376 A * | 12/1996 | Harrington | ................. | 358/518 |
| 5,592,591 A * | 1/1997 | Rolleston | ................... | 358/518 |
| 5,734,802 A * | 3/1998 | Maltz et al. | ................. | 358/1.9 |
| 7,023,585 B1 * | 4/2006 | Borg | .......................... | 358/1.9 |
| 2007/0153020 A1 * | 7/2007 | Inoue | ........................ | 345/591 |
| 2008/0018961 A1 * | 1/2008 | Borg | ......................... | 358/518 |

* cited by examiner

*Primary Examiner*—Kimberly A Williams
(74) *Attorney, Agent, or Firm*—Trop, Pruner & Hu, P.C.

(57) ABSTRACT

Apparatus, systems and methods for tetrahedral color conversion for image processing are disclosed. In one implementation a system includes memory at least capable of storing and/or holding one or more color conversion look-up tables. The system also may include an image processor at least capable of determining address values in response to input color component values, accessing a selected first look-up table of two or more first look-up tables in response to the address values, and of generating output color component values in response to accessing the selected first look-up table. The system may also include an image output device responsive to the output color component values.

12 Claims, 7 Drawing Sheets

| LUT Input | LUT Output | |
|---|---|---|
| Input Pixel Component [7:0] | Component Index [13:8] | Component Fraction [7:0] |

| Memory Address | Component in LSB | Component in MSB |
|---|---|---|
| Base-0 + 0x0 | K0(0,0,0) | Y0(0,0,0) |
| Base-0 + 0x1 | M0(0,0,0) | C0(0,0,0) |
| Base-0 + 0x2 | K0(1,0,0) | Y0(1,0,0) |
| Base-0 + 0x3 | M0(1,0,0) | C0(1,0,0) |
| Base-0 + 0x4 | K0(2,0,0) | Y0(2,0,0) |
| Base-0 + 0x5 | M0(2,0,0) | C0(2,0,0) |
| ... | ... | ... |

| Tetrahedron 1 | |
|---|---|
| R_fract >= G_fract<br>G_fract < B_fract<br>R_fract >= B_fract | V1_addr = (R_indx + 1) * k * k + G_indx * k + B_indx<br>V2_addr = (R_indx + 1) * k * k + G_indx * k + (B_indx + 1)<br>V3_addr = (R_indx+1) * k * k + (G_indx+1) * k + (B_indx + 1) |

602, 604

| Tetrahedron 2 | |
|---|---|
| R_fract >= G_fract<br>G_fract >= B_fract<br>R_fract >= B_fract | V1_addr = (R_indx + 1) * k * k + G_indx * k + B_indx<br>V2_addr = (R_indx + 1) * k * k + (G_indx + 1) * k + B_indx<br>V3_addr = (R_indx+1) * k * k + (G_indx+1) * k + (B_indx + 1) |

| Tetrahedron 3 | |
|---|---|
| R_fract >= G_fract<br>G_fract < B_fract<br>R_fract < B_fract | V1_addr = R_indx * k * k + G_indx * k + (B_indx +1)<br>V2_addr = (R_indx + 1) * k * k + G_indx * k + (B_indx + 1)<br>V3_addr = (R_indx+1) * k * k + (G_indx+1) * k + (B_indx + 1) |

| Tetrahedron 4 | |
|---|---|
| R_fract < G_fract<br>G_fract >= B_fract<br>R_fract >= B_fract | V1_addr = R_indx * k * k + (G_indx + 1) * k + B_indx<br>V2_addr = (R_indx + 1) * k * k + (G_indx + 1) * k + B_indx<br>V3_addr = (R_indx+1) * k * k + (G_indx+1) * k + (B_indx + 1) |

| Tetrahedron 5 | |
|---|---|
| R_fract < G_fract<br>G_fract < B_fract<br>R_fract < B_fract | V1_addr = R_indx * k * k + G_indx * k + (B_indx + 1)<br>V2_addr = R_indx * k * k + (G_indx + 1) * k + (B_indx + 1)<br>V3_addr = (R_indx+1) * k * k + (G_indx+1) * k + (B_indx + 1) |

704

| Tetrahedron 6 | |
|---|---|
| R_fract < G_fract<br>G_fract >= B_fract<br>R_fract < B_fract | V1_addr = R_indx * k * k + (G_indx + 1)* k + B_indx<br>V2_addr = R_indx * k * k + (G_indx + 1) * k + (B_indx + 1)<br>V3_addr = (R_indx+1) * k * k + (G_indx+1) * k + (B_indx + 1) |

| | |
|---|---|
| Tetrahedron 1 | DRC = C1 - C0; DRM = M1 – M0; DRY = Y1 - Y0; DRK = K1 - K0<br>DGC = C3 - C2; DGM = M3 - M2; DGY = Y3 - Y2; DGK = K3 - K2<br>DBC = C2 - C1; DBM = M2 - M1; DBY = Y2 - Y1; DBK = K2 - K1 |
| Tetrahedron 2 | DRC = C1 - C0; DRM = M1 – M0; DRY = Y1 - Y0; DRK = K1 - K0<br>DGC = C2 – C1; DGM = M2 – M1; DGY = Y2 – Y1; DGK = K2 – K1<br>DBC = C3 – C2; DBM = M3 – M2; DBY = Y3 – Y2; DBK = K3 – K2 |
| Tetrahedron 3 | DRC = C2 – C1; DRM = M2 – M1; DRY = Y2 – Y1; DRK = K2 – K1<br>DGC = C3 – C2; DGM = M3 – M2; DGY = Y3 – Y2; DGK = K3 – K2<br>DBC = C1 – C0; DBM = M1 – M0; DBY = Y1 – Y0; DBK = K1 – K0 |
| Tetrahedron 4 | DRC = C2 – C1; DRM = M2 – M1; DRY = Y2 – Y1; DRK = K2 – K1<br>DGC = C1 – C0; DGM = M1 – M0; DGY = Y1 – Y0; DGK = K1 – K0<br>DBC = C3 – C2; DBM = M3 – M2; DBY = Y3 – Y2; DBK = K3 – K2 |
| Tetrahedron 5 | DRC = C3 – C2; DRM = M3 – M2; DRY = Y3 – Y2; DRK = K3 – K2<br>DGC = C2 – C1; DGM = M2 – M1; DGY = Y2 – Y1; DGK = K2 – K1<br>DBC = C1 – C0; DBM = M1 – M0; DBY = Y1 – Y0; DBK = K1 – K0 |
| Tetrahedron 6 | DRC = C3 – C2; DRM = M3 – M2; DRY = Y3 – Y2; DRK = K3 – K2<br>DGC = C1 – C0; DGM = M1 – M0; DGY = Y1 – Y0; DGK = K1– K0<br>DBC = C2 – C1; DBM = M2 – M1; DBY = Y2 – Y1; DBK = K2 – K1 |

| Memory Address | Component in LSB | Component in MSB |
|---|---|---|
| 0x0 | M(0) | C(0) |
| 0x1 | M(1) | C(1) |
| 0x2 | M(2) | C(2) |
| . . . | . . . | . . . |
| 0x254 | M(254) | C(254) |
| 0x255 | M(255) | C(255) |
| 0x256 + 0x0 | K(0) | Y(0) |
| 0x256 + 0x1 | K(1) | Y(1) |
| 0x256 + 0x2 | K(2) | Y(2) |
| . . . | . . . | . . . |
| 0x256 + 0x254 | K(254) | Y(254) |
| 0x256 + 0x255 | K(255) | Y(255) |

Fig. 9

METHOD, APPARATUS AND SYSTEM FOR PERFORMING TETRAHEDRAL COLOR CONVERSION FOR IMAGE PROCESSING

BACKGROUND

Image processing has traditionally been undertaken using either devices designed specifically to provide image processing (e.g., application specific integrated circuits (ASICs)) or more general purpose devices (e.g., digital signal processors (DSPs)) where the image processing has been adapted to match existing device functionality. Although ASICs may provide specific functionality they are also costly to design, have long development cycles and tend to be inflexible. While DSPs may, on the other hand, be more flexible than ASICs they are also more difficult to optimize for image processing.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIG. 5 illustrates a portion of an example pre-processing look-up table;

FIG. 6 illustrates a portion of an example color conversion look-up table;

FIG. 7 illustrates example relationships between fraction values, color conversion tetrahedrals, and destination partial component address values;

FIG. 8 illustrates example relationships between color conversion tetrahedral and destination partial component difference values; and FIG. 9 illustrates portions of an example color correction look-up table.

DETAILED DESCRIPTION

The following detailed description refers to the accompanying drawings. The same reference numbers may be used in different drawings to identify the same or similar elements. In the following description specific details are set forth such as particular structures, architectures, interfaces, techniques, etc. in order to provide a thorough understanding of the various aspects of the claimed invention. However, such details are provided for purposes of explanation and should not be viewed as limiting. Moreover, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
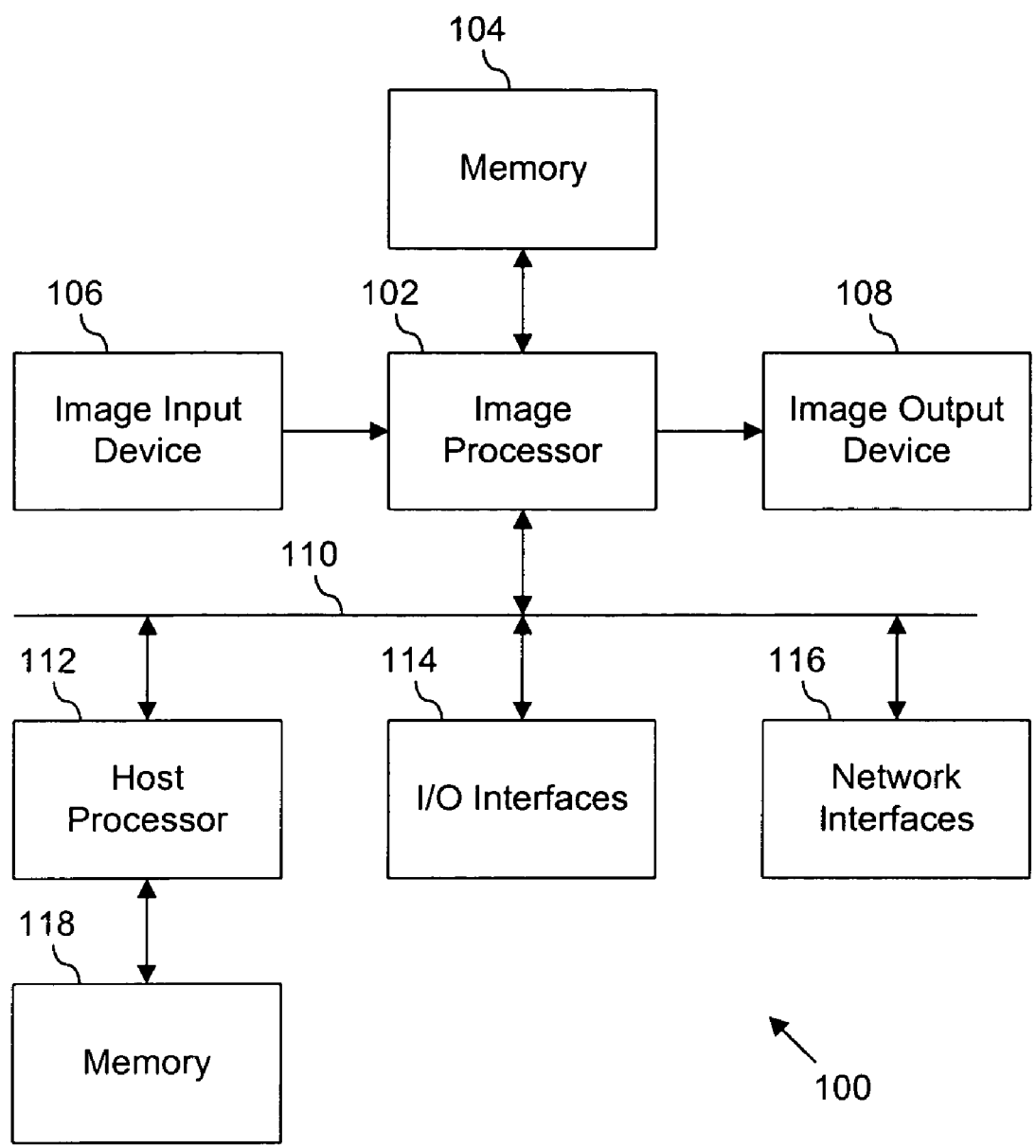
FIG. 1 illustrates an example image processing system.

FIG. 1 illustrates an example system 100 according to one implementation of the invention. System 100 may include one or more image processors (IP) 102, memory 104, one or more image input devices 106, and one or more image output devices 108. In addition, in one implementation, IP 102 may communicate over a shared bus 110 or other communication mechanism with a host processor 112, one or more input/output (I/O) interfaces 114 (e.g., universal synchronous bus (USB) interfaces, parallel ports, serial ports, telephone ports, and/or other I/O interfaces), and/or one or more network interfaces 116 (e.g., wired and/or wireless local area network (LAN) and/or wide area network (WAN) and/or personal area network (PAN), and/or other wired and/or wireless network interfaces). Host processor 112 may also communicate with one or more memory devices 118.

Image processor 102 may include one or more devices capable of performing one or more image processing functions. In one implementation, image processor 102 may receive input image data (e.g., in the form of image pixel color component data and/or indicators and/or indicator data) from memory 104 and/or from image input device 106. In one implementation, image processor 102 may provide for tetrahedral color conversion image processing, and may undertake tetrahedral color conversion of input color component data in response to indicators and/or indicator data associated with the input color component data. In one implementation, IP 102 may undertake tetrahedral color conversion of input component data in response to indicator data and/or input data associated and/or appended to one or more portions of that input component data. In other implementations, IP 102 may undertake tetrahedral color conversion of input component data in response to indicators and/or static data stored and/or located in, for example, one or more registers and/or files. Image processor 102 may output tetrahedral color converted output component data to memory 104 and/or image output device 108.

Memory 104 and/or memory 118 may be any device and/or mechanism capable of storing and/or holding image component data (input and/or output), indicators and/or indicator data, and/or other data and/or instructions to name a few examples. For example, although the invention is not limited in this regard, memory 104 and/or memory 118 may be static random access memory (SRAM), dynamic random access memory (DRAM) or another other memory mechanism (e.g., non-volatile memory). In one implementation, although the invention is not limited in this regard, memory 104 may store and/or hold data in the form of look-up tables (LUTs) for use by processor 102 in performing tetrahedral color conversion.

Image input device(s) 106 may include any of a number of mechanisms and/or device(s) suitable for capturing image data. For example, although the invention is not limited in this regard, an image input device 106 may include a sensor array (e.g., a CMOS/CCD sensor array), and/or another type of image capture mechanism. Image output device(s) 108 may include any of a number of mechanisms and/or device(s) that consume and/or display image data. For example, although the invention is not limited in this regard, image output device 108 may include a printer, computer monitor and/or other type of image display or output mechanism.

Host processor 112 may be, in various implementations, a special purpose or a general purpose processor. Further, host processor 112 may comprise a single device (e.g., a microprocessor or ASIC) or multiple devices. In one implementation, host processor 112 may be capable of performing any of a number of tasks that support image processing. These tasks may include, for example, although the invention is not limited in this regard, providing indicators and/or indicator data image to IP 102, providing tetrahedral color conversion processing LUTs to IP 102 and/or memory 104, downloading microcode to IP 102, initializing and/or configuring registers within IP 102, interrupt servicing, and providing a bus interface for uploading and/or downloading image data (i.e., color component data). In alternate implementations, some or all of these functions may be performed by IP 102.

Figure 2:
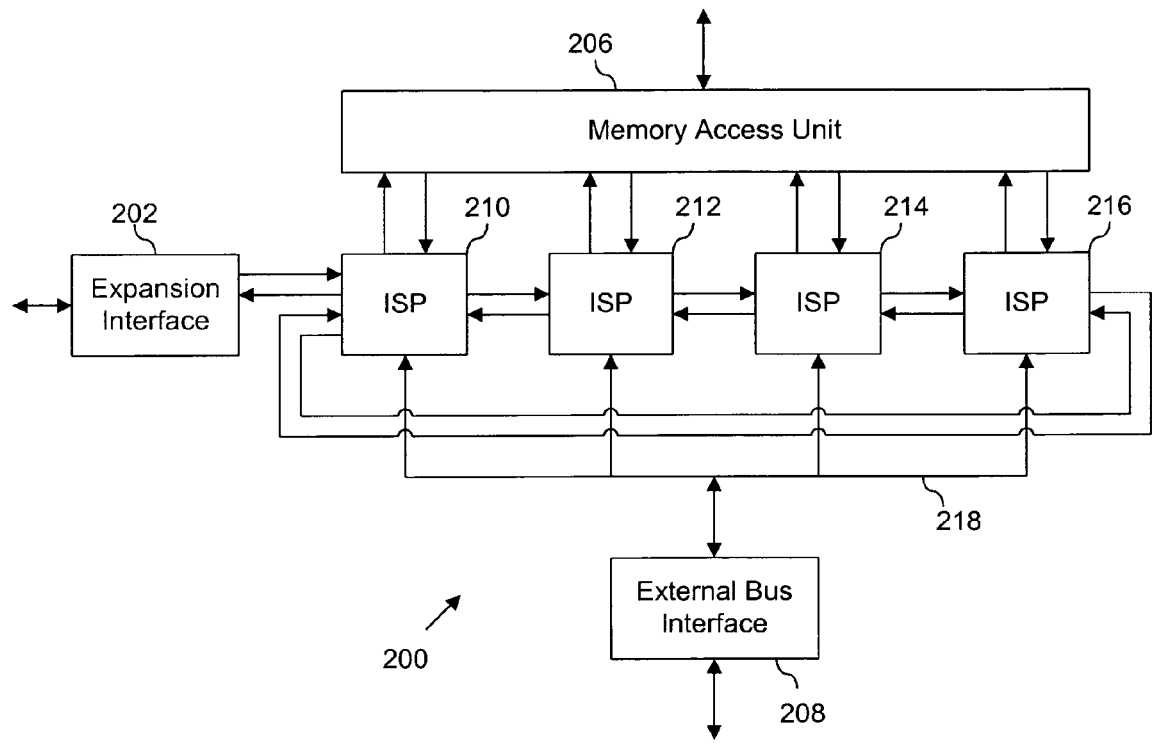
FIG. 2 illustrates the image processor of the system of FIG. 1 in more detail.

FIG. 2 is a simplified block diagram of an image processing device 200 (e.g., image processor 102, FIG. 1), in accordance with an implementation of the invention. Image processing device 200 may include one or more expansion interfaces 202, one or more memory access units 206, one or more external bus interfaces 208, and one or more image signal processors (ISPs) 210, 212, 214, 216.

In one implementation, expansion interfaces 202 may enable image processing device 200 to be connected to other devices and/or integrated circuits (ICs) within a system (e.g., image input device 106 and/or image output device 108, FIG. 1). Each expansion interface 202 may be programmable to accommodate the device to which it is connected. In one implementation, each expansion interface 202 may include a parallel I/O interface (e.g., an 8-bit, 16-bit or other interface), and the expansion interfaces 202 may use the parallel I/O interface to simultaneously transfer data, such as image pixel data, into and/or out of device 200.

Memory access unit 206 may enable data to be stored within and/or retrieved from an external memory device (e.g., memory 104, FIG. 1). However, the invention is not limited in this regard, and, for example, device 200 may include internal memory (not shown) for storing and/or holding data such as image pixel data. In one implementation, memory access unit 206 may support a parallel (e.g., 8-bit, 16-bit or other) interface.

External bus interface 208 may enable device 200 to connect to an external bus (e.g., bus 110, FIG. 1). In one implementation, bus interface 208 may enable device 200 to receive image component data, tetrahedral color conversion processing LUTs and/or data obtained therefrom, microcode, configuration information, debug information, and/or other information or data from an external host processor (e.g., processor 112, FIG. 1), and to provide that information to ISPs 210, 212, 214, 216 via a global bus 218.

Image data may be processed by one or more of ISPs 210-216. In one implementation, ISPs 210-216 may be interconnected in a mesh-type configuration, although the invention is not limited in this regard. ISPs 210-216 may process data in parallel and/or in series, and each ISP 210-216 may perform the same or different functions. Further, ISPs 210-216 may have identical or different architectures. Although four ISPs 210-216 are illustrated, in other implementations device 200 may have more or fewer ISPs than ISPs 210-216.

In one implementation, at least one ISP 210-216 is capable of executing image processing using tetrahedral color conversion. More particularly, at least one ISP 210-216 may implement an architecture for tetrahedral color conversion image processing, where tetrahedral color conversion coefficients may be selected and/or reconfigured any number of times. In one implementation, sets of tetrahedral color conversion coefficients organized as LUTs may be selected in response to reconfigurable data and/or indicators. Moreover, in one implementation, one or more tetrahedral color conversion LUTs may be selected and/or reconfigured in response to indicators and/or indicator data associated with the image color component input data being processed by the tetrahedral color conversion architecture.

Further, at least one ISP 210-216 may be configured to selectively perform various color component data processes to support tetrahedral color conversion in accordance with the invention. Methods and apparatus for implementing tetrahedral color conversion in accordance with the invention will be described in more detail later.

In one implementation, the type of tetrahedral color conversion implemented (e.g., conversion from red-green-blue (RGB) to cyan-magenta-yellow-black (CMYK)), and/or the depth of the tetrahedral color conversion implemented (e.g., conversion of 24-bit input data comprising three 8-bit color components to 32-bit output data comprising four 8-bit color components) may be configured in accordance with the invention. For example, but not by way of limitation, one or more of ISPs 210-216 may be configured to perform tetrahedral color conversion of 24-bit RGB input data to 32-bit CMYK output data. However, the invention is not limited to implementing a specific type and/or depth of tetrahedral color conversion and may, for example, implement any conversion of three component input data to one, two, three, and/or four component output data. Below, example implementations are described for converting 24-bit RGB data to 32-bit CMYK data. It is to be understood, however, that this is for illustration purposes only, and that tetrahedral color conversion of other data types, dimensionality and/or depths may be implemented in accordance with the invention.

In addition, implementations of tetrahedral color conversion in accordance with the invention may be configured in real-time (i.e., dynamically) in response to indicators and/or indicator data associated with and/or appended to the input component data. For example, in one implementation, the format of input data supplied to one or more of ISPs 210-216 may be configurable. Image data may come in any of a number of forms, but generally each data value represents a pixel intensity. Pixel data may come in the form of three-component sampled (e.g., red/green/blue or RGB) values for example. However, the invention is not limited in this regard and other three-component input values may be used. Further, the input data may be input in a packed and/or in an un-packed data format. The invention is, however, not limited to a particular pixel data format.

Figure 3:
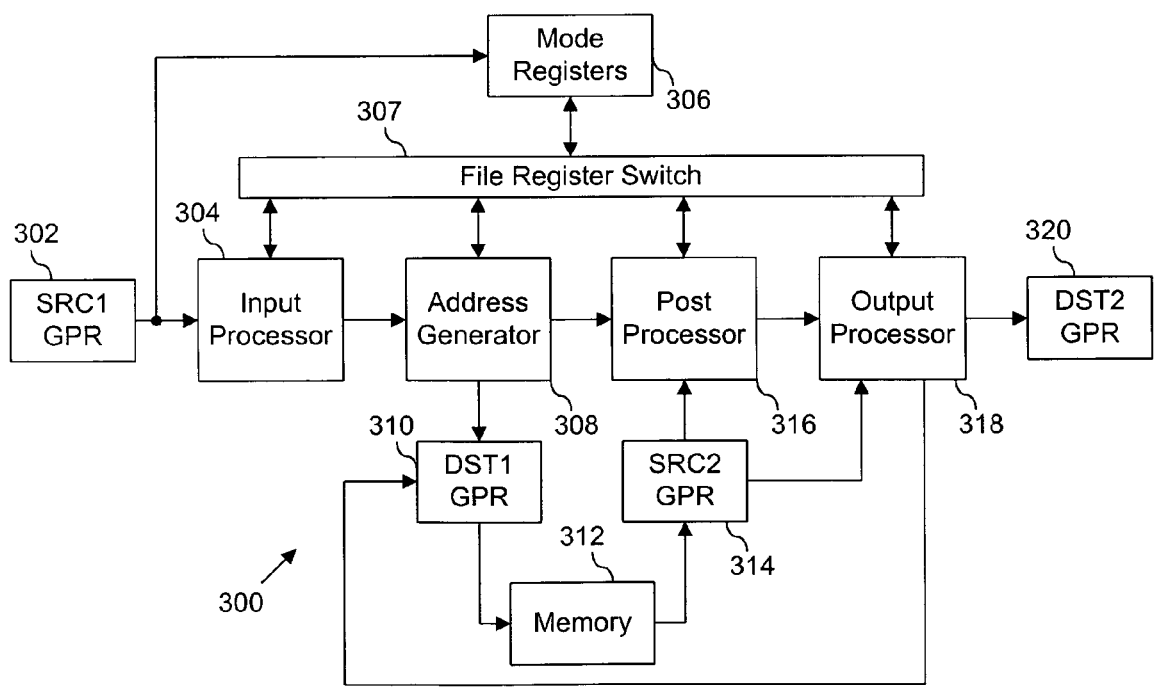
FIG. 3 illustrates portions of the image processor of FIG. 2 in more detail.

FIG. 3 is a simplified block diagram of a device 300 (e.g., ISP 210, FIG. 2), in accordance with the invention. In one implementation, device 300 includes a first source register (SRC1 GPR) 302, an input processor 304, a mode register 306, a register file switch 307, an address generator (AG) 308, a first destination register (DST1 GPR) 310, memory 312, a second source register (SRC2 GPR) 314, a post processor 316, an output processor 318, and a second destination register (DST2 GPR) 320. In various implementations, one or more of processors 304, 316, 318 and/or address generator 308 may be micro-engines, which may be programmed using micro-code provided, for example, by host processor 112 (FIG. 1). Accordingly, one or more of processors 304, 316, 318 and/or address generator 308 may perform substantially the same and/or substantially different operations.

Input processor 304 may, in one implementation, obtain input component data from GPR 302 and may obtain index and fraction values for each input component value using one or more preprocessing LUTs as will be described below in greater detail. For example, processor 304 may obtain 8-bit RGB component values from GPR 302 and may obtain index and fraction values corresponding to each R, G and B component value by accessing, for each color component, a separate preprocessing LUT stored and/or held in file register file switch 307. The one or more preprocessing LUTs accessed by processor 304 and/or held and/or stored in switch 307 may be pre-programmed to provide index and fraction values for each possible pixel component value as will be described in more detail below. In one implementation, processor 304 provides the index and fraction values to address generator 308. The input component data provided to processor 304 may packed or unpacked and may or may not contain indicators and/or indicator data to enable the selection of color conversion LUTs as will be discussed below.

In one implementation, register file switch 307 may include a cross-bar switch. Accordingly, register file switch 307 may include communication registers useful for communicating information and/or data such as input component data and/or LUTs between elements 304, 308, 316, and 318. Moreover, while device 300 is depicted as having discrete mode, source and destination registers 302, 306, 310, 314, and 320, the invention is not limited in this regard and those of skill in the art will recognize that the functionality of one or more of registers 302, 306, 310, 314, and 320 may be provided by switch 307.

Address generator (AG) 308 may, in one implementation, obtain component index values from processor 304 and may use those index values to generate and/or determine an address value, V0_addr as will be described in more detail below. In one implementation, AG 308 may use the V0_addr address value to access, using GPR 310, one or more color conversion LUTs held and/or stored in memory 312. The one or more conversion LUTs may be preprogrammed to provide partial color components of the destination color space (e.g., CMYK) for each possible V0_addr value as will be described in more detail below. In one implementation, the particular conversion LUT of the one or more conversion LUTs accessed by AG 308 may be selected in response to indicator data provided by mode register 306. Alternatively, in another implementation, the particular conversion LUT of the one or more conversion LUTs accessed by AG 308 may be selected in response to one or more indicators and/or indicator data associated with and/or appended to the input component data. In response to the V0_addr address value provided to memory 312 by AG 308 via GPR 310, memory 312 may gather corresponding C0, M0, Y0, and K0 values.

In one implementation AG 308 may also utilize the pixel component fraction values (e.g., R_fract, G_fract, and B_fract) provided by input processor 304 to determine the particular color tetrahedron that the pixel associated with a particular fraction value belongs to as will be explained in greater detail below.

In one implementation, post-processor (PP) 316 may gather and/or obtain from memory 312, via GPR 314, the C0, M0, Y0, and K0 partial component values as well as the Cx, Mx, Yx, and Kx partial component values obtained and/or gathered as described above. PP 316 may obtain these partial component values from memory 312 via GPR 314 as will be described in greater detail below. PP 316 may then use those partial component values, and the determination of the appropriate tetrahedron as may be supplied, for example, by AG 308 to generate and/or determine destination color component values by generating and/or determining component difference values as will be described in greater detail below. Having obtained and/or determined component difference values, PP 316 may, in one implementation, obtain and/or determine final destination component values (e.g., a destination four component CMYK color space) using relationships that will be described in further detail below.

Output processor (OP) 318 may receive destination component values from PP 316 and may perform color correction on those values. In one implementation, OP 318 may access, via GPRs 310 and 314, one or more color correction LUTs stored and/or held in memory 312 to enable color correction as will be described in greater detail below. In one implementation, OP 318 may gather the color corrected destination component values from memory 312 (via GPR 314) and may supply those color corrected destination component values as output component data to DST2 GPR 320.

In one implementation, the output component data supplied by OP 318 may be supplied in a variety of data formats. For example, although the invention is not limited in this regard, OP 318 may supply output data to GPR 320 in packed 16-bit data format and/or in unpacked 8-bit data format.

Memory 312 may be any mechanism and/or device(s) capable of holding and/or storing data, such as one or more color conversion and/or color correction LUTs. For example, memory 402 may be Double Data Rate (DDR) DRAM memory. As those skilled in the art will recognize a memory such as DDR DRAM may facilitate the storage and/or holding of larger data sets such as LUTs while still providing rapid read/write access to such large data sets or tables. However, the invention is not limited in this regard, and memory 312 may be implemented in other memory types (e.g., SRAM, non-volatile memory, etc) without departing from the scope or spirit of the invention.

In one implementation, the color conversion LUTs stored in memory 312 may hold and/or store two bytes of destination color components for each address. Hence, for example, for conversion of three-component RGB pixel data into four-component CMYK pixel data, two addresses of memory 312 may be required to access each CMYK pixel's data. Moreover, the color conversion LUTs stored and/or held in memory 312 may be stored and/or held in a packed format.

In addition, in one implementation, device 300 may support two base addresses to specify which color conversion LUT of the one or more color conversion LUTs stored and/or held in memory 312 may be accessed by address generator 308 via GPR 310. In one implementation, the indicators and/or indicator data appended and/or associated with the input component pixel data may specify which base address, and hence which color conversion LUT stored and/or held in memory 312, address generator 308 accesses.

As discussed previously, a tetrahedral color conversion device such as device 300 may be configurable in any one of a number of ways. In one implementation, device 300 may have a configuration specified in response to configuration information stored within mode register 306. In one implementation, AG 308 may be configured to access certain ones of color conversion LUTs held and/or stored in memory 312 in response to configuration information and/or indicators and/or indicator data associated with and/or appended to input component data.

Device 300 may also be configured by programming mode register 306. For example, although the invention is not limited in this regard, mode register 306 may be programmed to: specify the number, size and/or type of color conversion LUTs stored and/or held in memory 312; the number of output pixel components; whether color correction is applied; whether the pack or unpack the output data; etc.

In one implementation, device 300 may be configured to accept, via GPR 302 and input processor 304, input data in a variety of data formats. For example, input color components supplied to input processor 304 may include indicators and/or indicator data that may specify a particular color conversion LUT to be accessed by address generator 308. In one implementation, devices external to device 300, for example, host processor 112 of FIG. 1, may append and/or insert such indicators and/or indicator data to the component input data.

Figure 4:
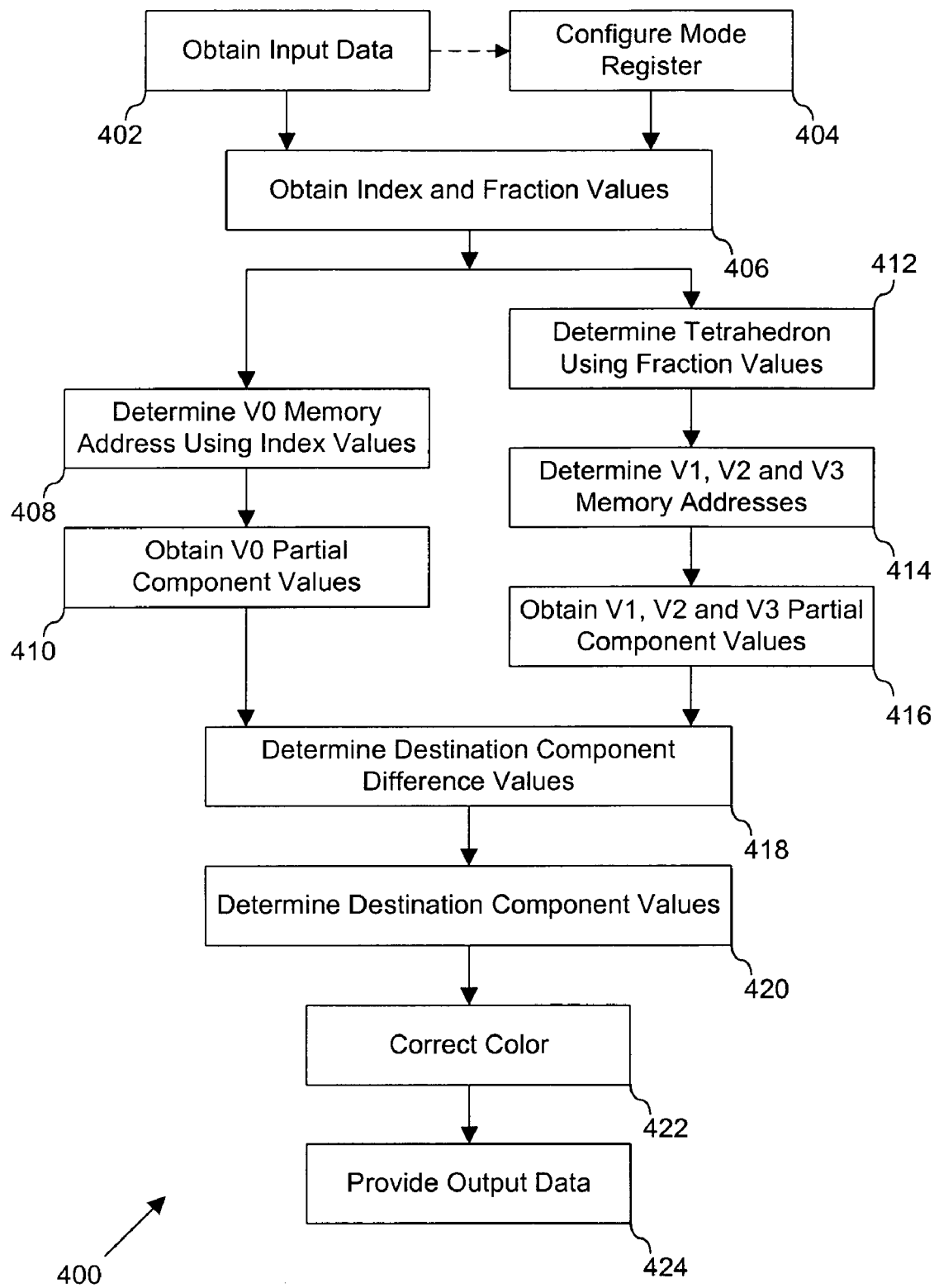
FIG. 4 is a flow chart illustrating an example process of tetrahedral color conversion.

FIG. 4 is a flow chart illustrating a process 400 for providing tetrahedral color conversion in accordance with the invention. While, for ease of explanation, process 400, and any associated processes, may be described with regard to system 100 of FIG. 1 and components of system 100 as illustrated in FIGS. 2 and 3, the claimed invention is not limited in this regard.

Process 400 may begin with the obtaining of source color space input component data [act 402]. In one implementation, input processor 304 may obtain the input component data from GPR 302. The input component data may come from a number of sources external to device 300. For example, although the invention is not limited in this regard, the input component data may be supplied to GPR 302 of device 300 by image input device 106.

Process 400 may continue with the configuring of the mode register [act 404]. This may be accomplished prior to, during, or after obtaining the input data in act 402. In one implementation, act 404 may be undertaken, at least in part, in response to one or more indicators and/or indicator data associated with and/or appended to the input data obtained in act 402. However, the invention is not limited in this regard, and those skilled in the art will recognize that act 404 may be accomplished by having a device external to device 300, such as host processor 112, provide configuring data to mode register 306. In one implementation, act 404 may include specifying the color conversion LUT or LUTs to be utilized with regard to undertaking the tetrahedral color conversion of the input data obtained in act 402 as will be described in further detail below.

Process 400 may continue with the obtaining of component index and fraction values [act 406]. For example, one way to do this is to have input processor 304 obtain the component index and fraction values corresponding to the input data by accessing a preprocessing LUT stored and/or held in register file switch 307.

FIG. 5 illustrates a portion of an example preprocessing LUT 500 in accordance with the invention. Preprocessing LUT 500 may associate each input pixel component value 502 with corresponding component index 504 and component fraction 506 values. While LUT portion 500 may represent only a small portion of one possible preprocessing LUT the invention is not limited in this regard and those skilled in the art will recognize that there are many other possible variations in the organization of a preprocessing LUT in accordance with the invention.

Referring again to FIG. 4, once component and fraction values have been obtained, process 400 may continue with the determination of the V0 memory address using the index value [act 408]. In one implementation, AG 308 may determine and/or generate the V0 memory address (e.g., V0_addr), according, for example in processing RGB index values, to the following relationship:

$$V0\_addr = k^2(R\_indx) + k(G\_indx) + B\_indx$$

where k may be a programmable factor representing the number of nodes, and the RGB index values are represented by R_indx, G_indx, and B_indx respectively. For example, k may be represented by a 6-bit programmable data field of mode register 306. For example, a color conversion LUT size of 9×9×9 may be selected by programming a binary value of k=9. Similarly, a color conversion LUT size of 16×16×16 may be selected by programming a binary value of k=16. However, the invention is not limited in this regard and a variety of color conversion LUT sizes may be programmed for and/or stored and/or held by memory 312. For example, device 300 may, in accordance with the invention, support color conversion utilizing a variety of color conversion LUT sizes (e.g., 9×9×9, 16×16×16, 22×22×22, 33×33×33, etc).

Process 400 may then continue with the procurement or obtaining of the V0 partial component value [act 410]. For example, this may be done by having AG 308 provide the V0 address value (as determined in act 408) to memory 312 via GPR 310. In response, memory 312 may gather corresponding C0, M0, Y0, and K0 partial component values (where x=1,2,3) from a color conversion LUT and then provide those partial component values to PP 316 via SRC2 GPR 314.

FIG. 6 illustrates selected portions of an example color conversion LUT 600 in accordance with the invention. Conversion LUT 600 may associate each V0_addr address value (e.g., memory address value 602) generated by AG 308 with corresponding partial component values (e.g., C0, M0, Y0, and K0) 604 and 606 of the destination color space. While LUT portion 600 may represent only a small portion of one possible color conversion LUT the invention is not limited in this regard and those skilled in the art will recognize that there are many other possible variations in the organization of a color conversion LUT in accordance with invention. In particular, those of skill in the art will recognize that example color conversion LUT 600 is organized such that each memory address 602 corresponds to (i.e., holds and/or stores) two bytes of partial component value data 604 and 606, hence, if, for example, the destination color space is a four component space with 8-bit component values then each V0_addr value supplied by AG 308 may need to specify two consecutive address values 602.

Referring again to FIG. 4, process 400 may continue with the determination of the specific tetrahedron using the fraction values [act 412]. For example, this may be done by having AG 308 determine the tetrahedron in response to the fraction values determined in act 406 as described above with respect to the example of FIG. 5.

FIG. 7. illustrates example relationships 700 between particular combinations of fraction values 702, the tetrahedron 704 specified by the relationship between those fraction values, and the associated relationships 706 for determining V1, V2, and V3 partial component address values V1_addr, V2_addr, and V3_addr respectively. For example, in one implementation, should AG 308 determine that the value of R_fract is less than the value of G_fract, that the value of G_fract is greater than or equal to the value of B_fract, and that the value of R_fract is less than the value of B_fract, then AG 308 may determine that the relevant tetrahedron is tetrahedron number six.

Referring again to FIG. 4. process 400 may continue with the determination of V1, V2, and V3 partial component addresses [act 414]. In one implementation, this may be accomplished by having AG 308 determine and/or generate the V1_addr, V2_addr, and V3_addr addresses according to certain relationships for each particular tetrahedron as illustrated, for example, in FIG. 7.

Process 400 may continue with the obtaining of V1, V2, and V3 partial component values [act 416]. In one implementation, AG 308 provide the V0_addr, V1_addr, V2_addr, and V3_addr address values (as determined in act 414) to memory 312 via GPR 310. In response, memory 312 may gather corresponding Cx, Mx, Yx, and Kx partial component values (where x=1,2,3) from a color conversion LUT (e.g., from portions of LUT 600 not shown in FIG. 6) and then provide those partial component values to PP 316 via SRC2 GPR 314.

Process 400 may continue with the determination of the destination color component difference values [act 418]. In one implementation, PP 316 may determine the destination color component difference values according to predetermined relationships between the partial component values depending upon tetrahedron. FIG. 8 illustrates an example of color component difference relationships for the various tetrahedrons.

Referring again to FIG. 4, process 400 may continue with a determination of destination color component values [act 420]. For example, having obtained and/or determined component difference values, PP 316 may, in one implementation, obtain and/or determine destination component values (e.g., a destination four component CMYK color space) using the following relationships:

$$C=(W*C0+R\_fract*DRC+G\_fract*DGC+B\_fract*DBC)/W$$

$$M=(W*M0+R\_fract*DRM+G\_fract*DGM+B\_fract*DBM)/W$$

$$Y=(W*Y0+R\_fract*DRY+G\_fract*DGY+B\_fract*DBY)/W$$

$$K=(W*K0+R\_fract*DRK+G\_fract*DGK+B\_fract*DBK)/W$$

where, W is 256.

Process 400 may continue with a correction of the destination color component values [act 422]. In one implementation, OP 318 may access, via GPRs 310 and 314, one or more color correction LUTs stored and/or held in memory 312 to enable color correction in accordance with act 422.

FIG. 9 illustrates portions of an example color correction LUT 900 in accordance with the invention. Color correction LUT 900 may associate each destination component value (e.g., expressed as an index and/or memory address 902 to the LUT) with corresponding color corrected destination component values 904 and 906. While FIG. 9 illustrates portions of one possible color correction LUT the invention is not limited in this regard and those skilled in the art will recognize that there are many other possible variations in the organization of a color correction LUT in accordance with invention.

Referring again to FIG. 4, process 400 may continue with the provision of output data [act 424]. For example, in one implementation, OP 318 may gather the color corrected destination component values from memory 312 (via GPR 314) and may supply those color corrected destination component values as output component data to DST2 GPR 320. Alternatively, should color correction not be implemented, OP 318 may gather destination component values from memory 312 via GPR 314 and may supply those color corrected destination component values as output component data to DST2 GPR 320.

The acts shown in FIG. 4 need not be implemented in the order shown; nor do all of the acts necessarily need to be performed. For example, color correction (act 422) need not be implemented. Also, those acts that are not dependent on other acts may be performed in parallel with the other acts. For example, as suggested by FIG. 4, acts 408 and 410 may be implemented substantially in parallel with acts 412-416. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, as described above, color conversion may be undertaken in a dynamic manner wherein the selection of a particular color conversion LUT in acts 410 and 416 may be undertaken in response to one or more indicators and/or indicator data associated with or appended to the input source component data obtained in act 402. Clearly, many other implementations may be employed to provide for tetrahedral color conversion for image processing consistent with the claimed invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
receiving color component values of a first color space;
obtaining index values and fraction values for the color component values of the first color space from a first look-up table; and
determining, in response to the index values and fraction values, corresponding color component values of a second color space by:
determining a color conversion tetrahedron in response to the fraction values;
obtaining partial component values of the second color space in response, at least in part, to the index values;
determining partial component difference values in response, at least in part, to the tetrahedron and to the partial component values; and
determining color component values of a second color space in response to the partial component difference values.

2. The method of claim 1, further comprising:
color correcting the color component values of the second color space using a third look-up table.

3. The method of claim 1, wherein the partial component values of the second color space are obtained from a second look-up table of one or more second look-up tables.

4. The method of claim 3, further comprising:
selecting the second look-up table in response to one or more indicators and/or indicator data.

5. The method of claim 4, wherein the color component values of the first color space include the one or more indicators and/or indicator data.

6. The method of claim 3, further comprising:
selecting the size of the second look-up table in response to a node indicator value and/or values.

7. An apparatus, comprising:
an input processing device, at least capable of obtaining index values and fraction values of color component values of a first color space from a first look-up table;
an address generating device, at least capable of accessing color component values of a second color space from a second look-up table of one or more second look-up tables by generating address values in response to the index values, said address generating device to;
determine a color conversion tetrahedron in response to the fraction values;
obtain partial component values of the second color space in response, at least in part, to the index values;
determine partial component difference values in response, at least in part, to the tetrahedron and to the partial component values; and determine color component values of a second color space in response to the partial component difference values; and memory, at least capable of storing and/or holding the one or more second look-up tables, the memory at least capable of providing the color component values of a second color space in response to the address values.

8. The apparatus of claim 7, wherein the color component values of the first color space include indicators and/or indicator data.

9. The apparatus of claim 8, wherein the address generating device is further capable of selecting a second look-up table in response to the indicators and/or indicator data.

10. The apparatus of claim 7, further comprising:

an output processing device at least capable of obtaining the color component values of the second color space.

11. The apparatus of claim 10, wherein the output processing device is at least also capable of accessing a third look-up table to correct the color of the color component values of the second color space.

12. The apparatus of claim 7, further comprising:

a register file switch, at least capable of holding and/or storing the first look-up table.

\* \* \* \* \*